(12) United States Patent
Fletcher et al.

(10) Patent No.: US 7,433,900 B2
(45) Date of Patent: *Oct. 7, 2008

(54) CUSTOM FILESYSTEM HAVING FILE MAPPINGS TO FILES OF A REAL FILESYSTEM

(75) Inventors: Thomas O. P. Fletcher, Ottawa (CA); Peter H. Van Der Veen, Ottawa (CA); Dan Dodge, Nepean (CA)

(73) Assignee: QNX Software Systems GmbH & Co. KG, Karlsbad (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,421

(22) Filed: Jan. 20, 2006

(65) Prior Publication Data

US 2006/0282440 A1 Dec. 14, 2006

Related U.S. Application Data

(63) Continuation-in-part of application No. 09/824,252, filed on Apr. 3, 2001, now Pat. No. 7,047,257.

(51) Int. Cl.
 *G06F 17/30* (2006.01)
(52) U.S. Cl. .................. 707/203; 707/202; 707/205
(58) Field of Classification Search ............. 707/2, 707/10, 202, 203, 205
See application file for complete search history.

(56) References Cited

U.S. PATENT DOCUMENTS

| | | | |
|---|---|---|---|
| 5,313,646 A | 5/1994 | Hendricks et al. | |
| 5,355,497 A | 10/1994 | Cohen-Levy | |
| 5,544,360 A | 8/1996 | Lewak et al. | |
| 5,603,019 A | 2/1997 | Kish | |
| 5,694,563 A | 12/1997 | Belfiore et al. | |
| 5,742,817 A | 4/1998 | Pinkoski | |
| 5,832,515 A * | 11/1998 | Ledain et al. | 707/202 |
| 5,873,085 A | 2/1999 | Enoki et al. | |
| 5,886,699 A | 3/1999 | Belfiore et al. | |
| 5,905,990 A | 5/1999 | Inglett | |
| 5,956,515 A | 9/1999 | Beals et al. | |
| 5,996,054 A * | 11/1999 | Ledain et al. | 711/203 |
| 6,021,408 A * | 2/2000 | Ledain et al. | 707/8 |
| 6,055,363 A | 4/2000 | Beals et al. | |
| 6,058,400 A * | 5/2000 | Slaughter | 707/201 |

(Continued)

OTHER PUBLICATIONS

Karlson et al., "The introduction of hierarchical structure and application security to Jaava web start deployment", Oct. 10-14, 2005.*

(Continued)

*Primary Examiner*—Jean M Corrielus
(74) *Attorney, Agent, or Firm*—Brinks Hofer Gilson & Lione

(57) ABSTRACT

A computer system having a computer, a custom filesystem, and a real filesystem is disclosed. The custom filesystem is comprised of virtual files that may be mapped to a subset of real files of the real filesystem. The custom filesystem may provide an arrangement of the virtual files to a user through the user interface. This limited arrangement may present the virtual files in a hierarchical arrangement that may be easily navigated and customized for a particular computer, group of computers, computer user, or group of computer users. The custom filesystem may maintain its own metafile information for the virtual files.

9 Claims, 8 Drawing Sheets

U.S. PATENT DOCUMENTS

| | | | |
|---|---|---|---|
| 6,321,219 | B1 | 11/2001 | Gainer et al. |
| 6,356,915 | B1 | 3/2002 | Chtchetkine et al. |
| 6,363,400 | B1 | 3/2002 | Chtchetkine et al. |
| 6,365,915 | B1 | 4/2002 | Hirai et al. |
| 6,385,625 | B1 * | 5/2002 | Slaughter .................... 707/201 |
| 6,883,093 | B2 | 4/2005 | McBrearty et al. |
| 7,047,257 | B2 | 5/2006 | Fletcher et al. |
| 7,065,588 | B2 * | 6/2006 | Konda et al. ................ 709/246 |
| 7,093,247 | B2 * | 8/2006 | Ashworth et al. ........... 717/174 |
| 7,117,495 | B2 * | 10/2006 | Blaser et al. ................ 717/174 |
| 7,171,659 | B2 * | 1/2007 | Becker et al. ............... 717/171 |
| 7,171,660 | B2 * | 1/2007 | McCaleb et al. ............ 717/171 |
| 2003/0163594 | A1 | 8/2003 | Aasheim et al. |
| 2004/0064434 | A1 | 4/2004 | Sampson |
| 2005/0050108 | A1 | 3/2005 | Sawant et al. |
| 2006/0206449 | A1 | 9/2006 | Fletcher et al. |
| 2006/0206450 | A1 | 9/2006 | Fletcher et al. |

OTHER PUBLICATIONS

Lendecke, V., "UNIX Filesystems without I-Nodes," Dr. Dobb's Journal, Feb. 1997, pp. 1-4.

Dourish, P., et al., "Using Properties for Uniform Interaction in the Presto Document System," CHI Letters, vol. 1,1, 1999, pp. 55-64.

Dourish, P., et al., "Extending Document Management Systems with User-Specific Active Properties," ACM Transactions on Information Systems, vol. 18, No. 2, Apr. 2000, pp. 140-170.

* cited by examiner

CUSTOM FILESYSTEM HAVING FILE MAPPINGS TO FILES OF A REAL FILESYSTEM

PRIORITY CLAIM

This application is a continuation-in-part application of U.S. application Ser. No. 09/824,252, filed Apr. 3, 2001 now U.S. Pat. No. 7,047,257, which is incorporated herein by reference.

BACKGROUND OF THE INVENTION

1. Technical Field

The present invention relates to a computer file management system that employs a local filesystem and a custom filesystem.

2. Related Art

Computer systems store data by encoding the data in a binary format and storing the binary data on a storage device. Storage devices may include hard disks, optical media, flash media, and the like. A computer operating system may be used to control the physical storage and retrieval operations of the storage device. Similarly, filesystem software may be used to logically organize the encoded data in files and directories on the storage device. The filesystem may be provided as part of the computer operating system or may be a separate software component that interfaces with the computer operating system. In either instance, the filesystem provides a logical interface between software programs executed by the computer and the corresponding storage device.

Existing filesystems suffer from a number of problems which may result in the inefficient use of computer and network resources. For example, many users may not need access to all of the files available through the filesystem on a regular basis. Rather, many users may need access to only a subset of the available files. However, existing filesystems present the user with a large amount of unnecessary file and directory information that effectively obscures the file and directory information the user is trying to obtain. In an attempt to address this problem, personal subdirectories may be created by the user through the filesystem to store personal files. This allows the user to store personal files in an identifiable location.

Although a user may use personal directories to organize non-executable data files that are created and accessed by various software applications, personal directories do not readily lend themselves to management of the actual software application packages that are run by the user. As a result, software application packages often are installed for multi-user access on one or more common storage devices. A system administrator may install an upgrade and/or make changes to a software application package using the appropriate common storage device to make the upgrade/changes accessible to all system users.

In this common storage device configuration, system users may modify or inadvertently damage files used in the execution of one or more software application packages. In the case of modifications, the modifications to a file may be useful to one group of users while other users may need access to the original version of the file. User specific configuration of a software application package may be difficult to implement, if at all, in such circumstances. When certain files are inadvertently damaged by a user, the software application package will no longer be accessible to the remaining system users. Consequently, it may be difficult to maintain an operational version of the software application package without placing substantial limitations on the interaction between the users and the software application.

Another file management problem relates to the administration of multiple versions of a software application package. When a network administrator attempts to perform a system-wide upgrade of a software application package, it may not be desirable or possible for all of the user systems on the network to operate with the new version. For example, different versions of a software application package may be distinct and rely on separate software components, such as executable files, libraries, patches, support files, and the like. Consequently, the software components of a particular version of a software application package may be incompatible with legacy software or hardware that is found on certain user systems. Further, a user may refuse to learn how to operate a new version of a software application package, particularly if it offers minimal advantages to the user over a prior version. Finally, a system administrator may anticipate problems with the removal of an older version of a software application package from one or more of the user systems.

Access to multiple versions of the same software application may be necessary to accommodate one or more of the foregoing situations. Again, existing filesystems present the user with a large amount of unnecessary file and directory information relating to the multiple versions of the software packages. The presence of this unnecessary file and directory information effectively obscures the particular software application versions that the user attempts to access.

SUMMARY

A computer system having a computer, a custom filesystem, and a real filesystem is disclosed. The custom filesystem is comprised of virtual files that may be mapped to a subset of real files of the real filesystem. The custom filesystem may provide an arrangement of the virtual files to a user through the user interface. This limited arrangement may present the virtual files in a hierarchical arrangement that may be easily navigated and customized for a particular computer, group of computers, computer user, or group of computer users. The custom filesystem may maintain its own metafile information for the virtual files.

The type of metafile information maintained by the custom filesystem and the way in which file requests are handled by the computer system may vary. The metafile information may indicate whether a file request associated with a particular virtual file is to be directed to the real file of the real filesystem or to a spilled file. The custom filesystem may process requests associated with the subset of real files prior to processing of the request by the real filesystem.

The computer system may comprise a configuration file that identifies one or more attributes associated with the computer or a computer user. The attributes identified by the configuration file may include a location of at least one package repository on the real filesystem, a location of at least one software package on the real filesystem, where the software package is identified for access by the computer system through the custom filesystem, a location for a root directory at which the custom filesystem is to be mounted, and/or a location for a spill directory root that is to be used by the custom filesystem for storage of files modified using the computer system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
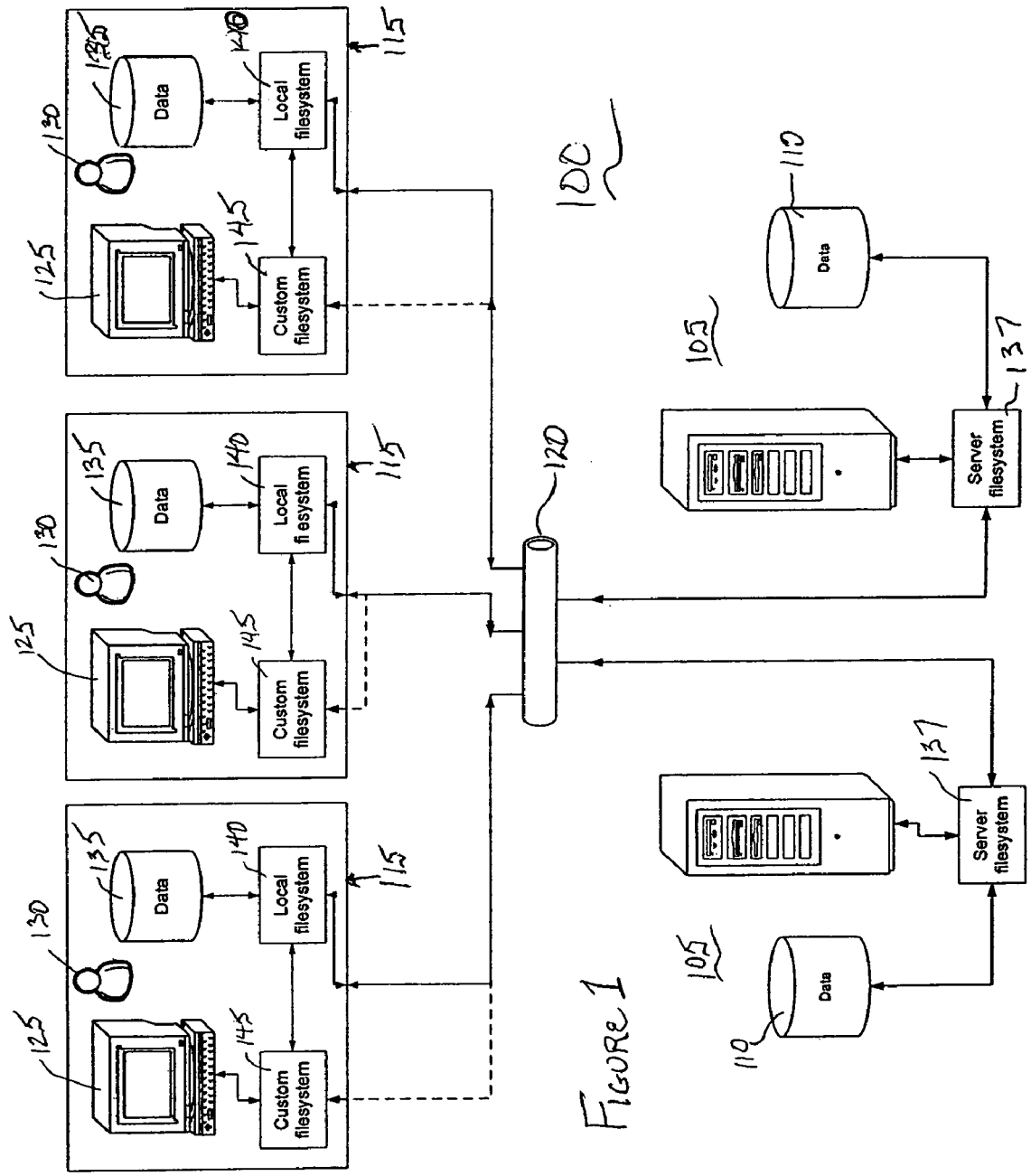
FIG. 1 is a block diagram of an exemplary computer network employing a local filesystem and a custom filesystem on a computer system of the network.

FIG. 1 is a block diagram of an exemplary computer network, shown generally at 100. The network system 100 may include one or more servers 105 having respective data storage devices 110. Servers 105 may be accessed by one or more computer systems 115 over, for example, an ethernet network 120. Each of the computer systems 115 may include a terminal 125 having a monitor, keyboard, pointing device and network interface card or the like, that allow a user 130 to interact with the computer system 115 and, if desired, to access files on one or more of the servers 105. The computer systems 115 also may include their own data storage devices 135.

The network 100 may include a number distinct filesystems that cooperate to establish an overall file management system. To this end, each of the computer systems 115 includes a local filesystem 140 that provides access to the actual files that are locally stored on storage device 135. Server filesystems 137 may be used to access the actual files that are remotely stored at one or more of the servers 105, such as at data storage devices 110. Each computer system 115 also includes a custom filesystem 145 that is logically interposed between a user 130 of the terminal 125 and the local filesystem 140. Alternatively, the custom filesystem 145 may be logically interposed between the user 130 of the terminal 125 and one or more of the server filesystems 137. In a still further alternative configuration, the local filesystem 140 may be logically interposed between the custom filesystem 145 and one or more of the server filesystems 137. As will be set forth below, the custom filesystem 145 includes virtual files that correspond to a selected subset of actual files located in the local filesystem 140 and/or server filesystems 137. When a file request relating to one of the virtual files is received by the custom filesystem 145, the custom filesystem handles the request prior to handling of the request, if any, by the local filesystem 140 and/or server filesystems 137, whichever filesystem contains the actual file.

Figure 2:
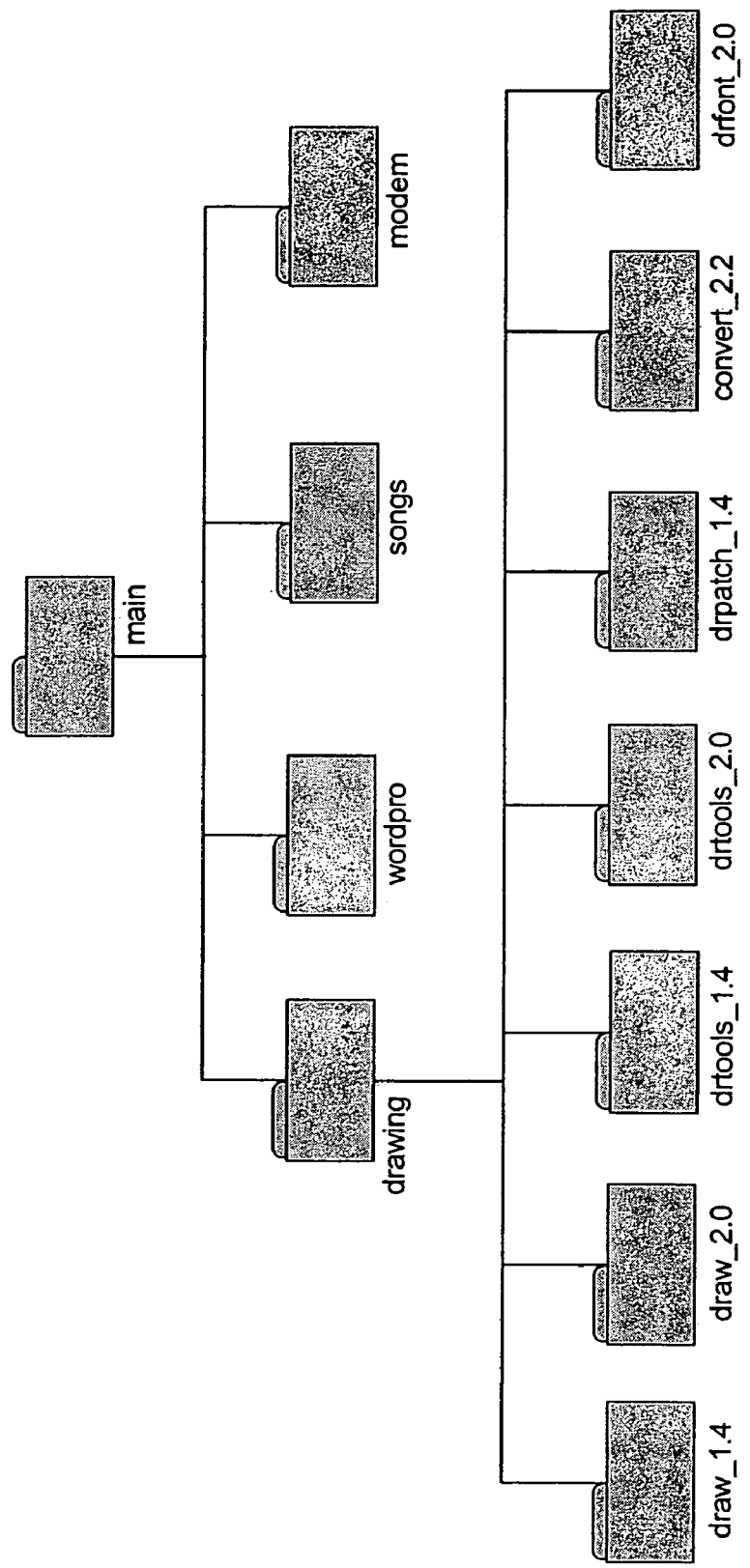
FIG. 2 is a flow chart illustrating a number of interrelated processes that may be used to generate the custom filesystems shown in FIG. 1.

A logical representation of the actual files and directories that, for example, make up one of the server filesystems 137 is shown in FIG. 2. The computer system 115 in this example does not employ a custom filesystem 145 and, consequently, all of the actual files of the server filesystem 137 are presented and accessible by the user. For exemplary purposes, three software packages are shown in a "drawing" subdirectory of the server filesystem 137: first and second versions of a drawing package (draw__1.4 and draw__2.0 respectively), and a format converting package (convert__2.2). Related files are also stored in this subdirectory: software tool sets for the two drawing packages (drtools__1.4 and drtools__2.0), a software patch for the first drawing package (drpatch__1.4), and a font set for the second drawing package (drfont__2.0). As software applications often comprise dozens of files that are installed in numerous subdirectories, management of these files can be complex.

Figure 3:
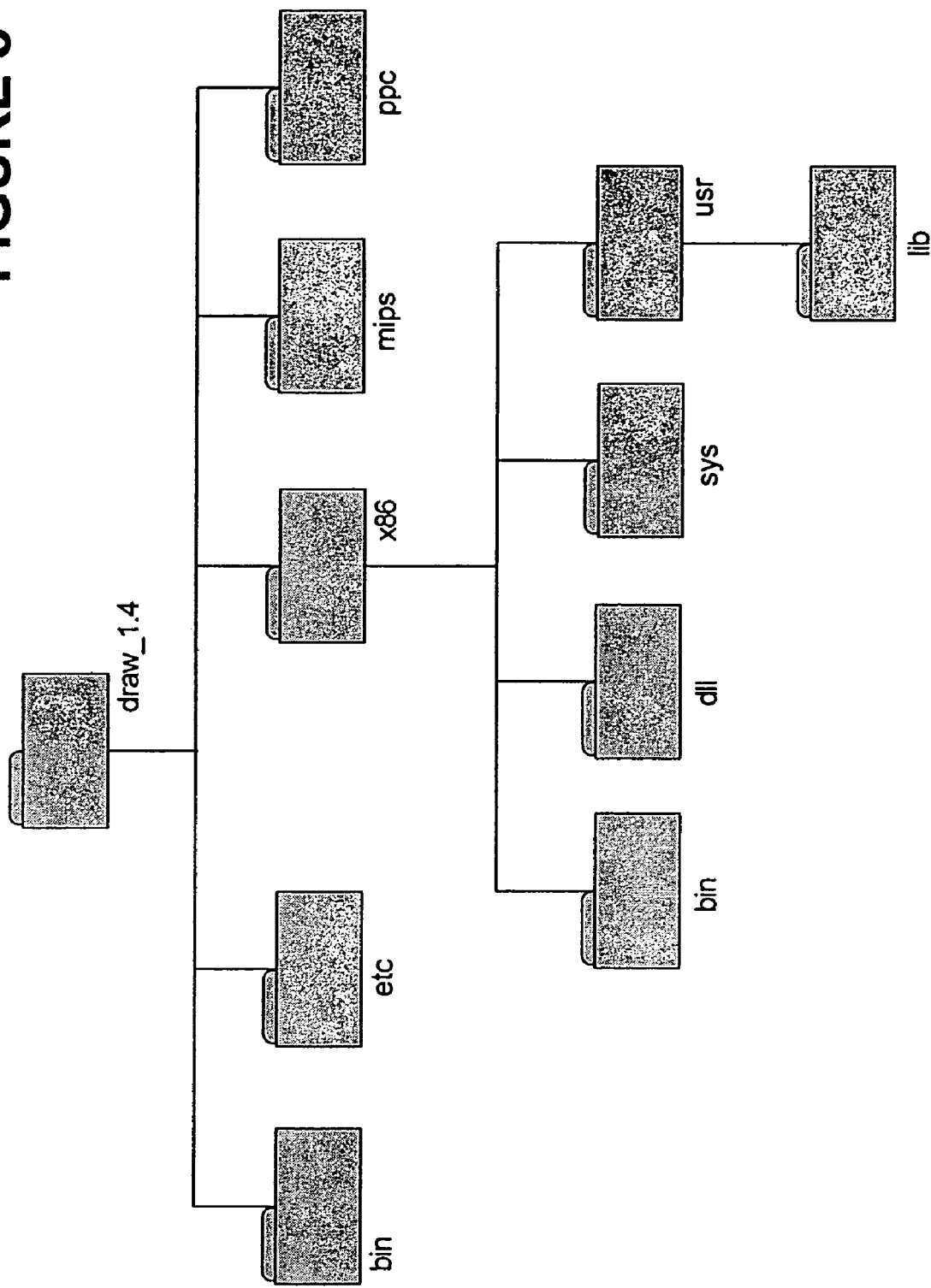
FIG. 3 is a hierarchical filesystem structure showing one manner in which the local filesystem may organize a number of different versions of a drawing program for presentation to a user without intervention of the custom filesystem.

An example of a set of subdirectories in server filesystem 137 for the software application of "draw__1.4" is shown in FIG. 3. For the sake of simplicity, the two higher levels in the hierarchical file/directory structure, "main" and "drawing", are not shown. As illustrated, this exemplary software application package has two top-level directories named "bin" and "etc" that are platform independent. Shell scripts and the like may be stored in the "bin" subdirectory while configuration files and the like may be stored in the "etc" subdirectory. The exemplary software application package also may include three top-level directories that are hardware architecture platform dependent: "x86," "mips," and "ppc." In the exemplary platform-specific files, the CPU type is encoded as part of the pathname. For example, x86-specific binaries are included in the pathname x86/bin. The balance of the identified directories store related files required by the draw__1.4 application. Both the /mips/ and /ppc/ subdirectories may have similar structures to that of the /x86/ subdirectory.

The custom filesystem 145 may limit user access to only a subset of the files and software that would otherwise be accessible directly through the local filesystem 140 and/or the server filesystem 137. This limited access ensures that a given computer system 115 only accesses and executes software packages that are needed, for example, by the corresponding user 130. Whether a computer system 115 is to have access to a subset of the software and/or files otherwise available through the local filesystem 140 and/or server filesystem 137 may be determined by storing the proper parameters in a node configuration file for the given computer system 115. The node configuration file may be automatically or manually configured based on attributes of the system 115 and, for example, may be stored on the data storage device 135 of the respective system 115. Each system 115 may have its own node configuration file. Alternatively, multiple computer systems 115 may share the same node configuration file or otherwise have identical node configuration files.

Figure 4:
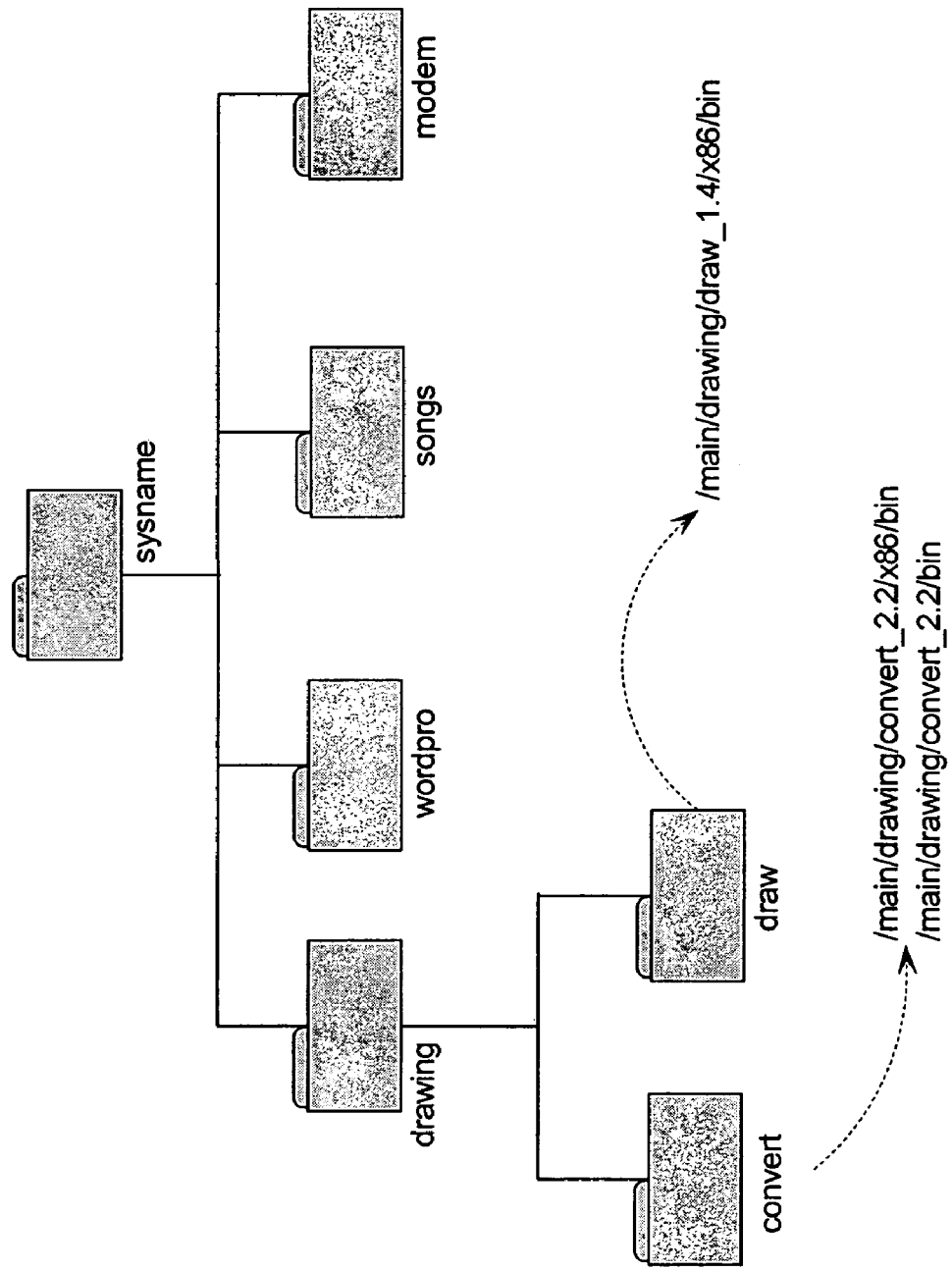
FIG. 4 is a hierarchical filesystem structure showing one manner in which the local filesystem may organize files associated with a given version of the drawing program for presentation to a user without the intervention of the custom filesystem.

FIG. 4 illustrates one manner in which the custom filesystem 145 may be configured to provide access to only certain files of the server filesystem 137 shown in FIGS. 2 and 3. In FIG. 4, the root level of the server filesystem 137 in FIG. 2 is common to all systems 115 and is labelled "main." In contrast, the root of the custom filesystem 145 is labelled "sysname." The label "sysname" may be replaced with a unique name corresponding to the particular user 130 or computer system 115. The next level of the custom filesystem 145 includes virtual file links to access various software applications: "drawing," "wordpro," "songs," and "modem".

At the level shown in FIG. 4, the custom filesystem 145 presents two directories and their corresponding files. These directories and files constitute virtual links to the two software applications that the computer system 115 is to access (convert_2.2 and draw_1.4). As such, only directories and their corresponding files are exposed by the custom filesystem 145 for access by the user 130 instead of the seven subdirectories that include all three software applications (per FIG. 3). If, for example, the system has a x86 processor, these two sub-directories may be linked to their respective locations in the server filesystem 137 in the manner shown—subdirectory "draw" being linked to /main/drawing/draw_1.4/x86/bin, and sub-directory "convert" being linked to /main/drawing/convert_2.2/x86/bin. The user interface to the selected software applications is simplified by the custom filesystem 145 since extraneous information relating to other files and applications that the user will not generally access has been removed. Furthermore, when the computer system 115 is upgraded, for example, to another version of the "draw" software (i.e., draw_2.0), a system administrator can easily implement the upgrade by changing the node configuration file used by the computer system 115. For example, the node configuration file may be changed to link an existing virtual file of the custom filesystem 145 to the location of the new software version in the server filesystem 137 so that the computer system 115 is re-directed by the custom filesystem 145 to execute the new software version. Alternatively, the node configuration file identifying the prior version of the software application package may be replaced with a new configuration file identifying the upgraded version of the software application package. Still further, the virtual files linked into the custom filesystem 145 may remain static while the actual files corresponding to the links may be updated. In each instance, the user is provided with a consistent, customized user interface.

Both processor specific and non-processor specific files may be included in the same sub-directory or folder of the custom filesystem 145. For example, the sub-directory in FIG. 4 labelled "convert" may be linked to both the x86 processor specific files at /main/drawing/convert_2.2/x86/bin, and to the more general files in sub-directory /main/drawing/convert_2.2/bin.

The custom filesystem 145 cooperates with one or more real filesystems, such as local filesystem 140 and/or server filesystems 137, so that file requests relating to files of the custom filesystem are redirected by the custom filesystem to the corresponding locations of real files through the real filesystem or, as will be described in further detail below, to a spill directory. Implemented in this manner, the custom filesystem may be realized on any computer system that allows file re-direction.

The foregoing system is particularly well-suited for selecting which software application packages in one or more software application repositories are to be accessible by a particular computer system 115. In the following examples, a software application package may be comprised of a number of files and directories that are related to one another by virtue of being part of a software product or of a particular software product release. Software packages may be considered immutable, read-only objects. Each software package may include a software package manifest file that describes various aspects of the corresponding software package—including a list of the files within the software package, the locations where each of the files of the package will be or are already installed, a description of the software package, any special requirements that the package may have, other software packages on which the software package depends, and any scripts that are to be executed when the package is installed or uninstalled. The software package manifest may be generated by the authors of the software and may be provided as one of the files of the software package file. A patch to an operating system or software program might contain only selected files and documentation (correlating with the files that have changed) and likewise may be considered a software package.

The location at which a software package is installed on the system 100 is called a repository. The system 100 may include numerous software package repositories. These repositories may be located, for example, on one or more of the servers 105 so that a given software package may be accessed by multiple users 130 using the respective computer systems 115.

Figure 5:
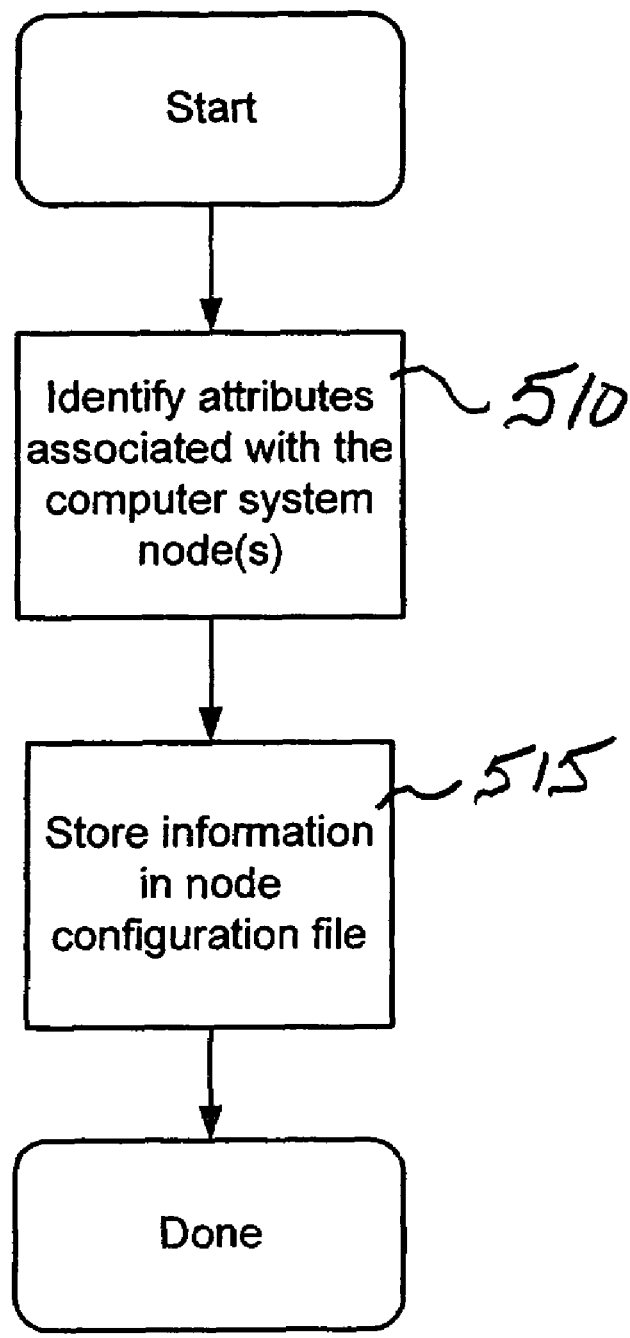
FIG. 5 is a hierarchical filesystem structure showing one manner in which the custom filesystem may organize files for access by the user of a given computer system on the computer network of FIG. 1.

An exemplary routine for setting up a node configuration file is shown in FIG. 5. At step 510, attributes associated with the computer system node are identified. The attributes may include static characteristics of the system and/or dynamic attributes. Static characteristics may include attributes such as the microprocessor model and operating system platform. Dynamic attributes may include characteristics that are based on the configuration of one or more of the servers 105. For example, dynamic attributes may identify the software packages that are to be accessible by the computer system 115 through the custom filesystem 145, the locations of the software package repositories, the version of a given software package that is to be made accessible, identification of the root directory at which the custom filesystem 145 is to be mounted, and the location of the spill directory that is to be used by the custom filesystem 145.

The attributes associated with the computer system 115 may be ascertained and/or provided at step 510 in a number of different manners. For example, static attributes such as the microprocessor model, operating system platform, BIOS version, clock speed, installed memory, hardware devices, drivers, and configurations such as sound, video and modem cards, and the like, may be identified using standard automatic system query techniques. Some dynamic attributes, such as which version of a software package is to be through the custom filesystem, may be determined automatically by comparing information in the software package manifest with one or more of the static attributes. This operation likewise may be executed manually by editing the node configuration file directly or through a corresponding node configuration file utility. Decisions on other dynamic attributes, such as which software packages are to be accessible at the computer system 115, may be made based on the preferences of a system administrator and/or user 130. Again, entry of the desired information into the node configuration file may be automated, achieved through direct editing of the file, and/or through the use of a node configuration file utility.

Once the static and dynamic attributes associated with the particular computer system 115 are known, the attributes are stored in the node configuration file at step 515. The node configuration file may be stored locally at the computer system 115 or remotely, such as on one of the servers 105.

Figure 6:
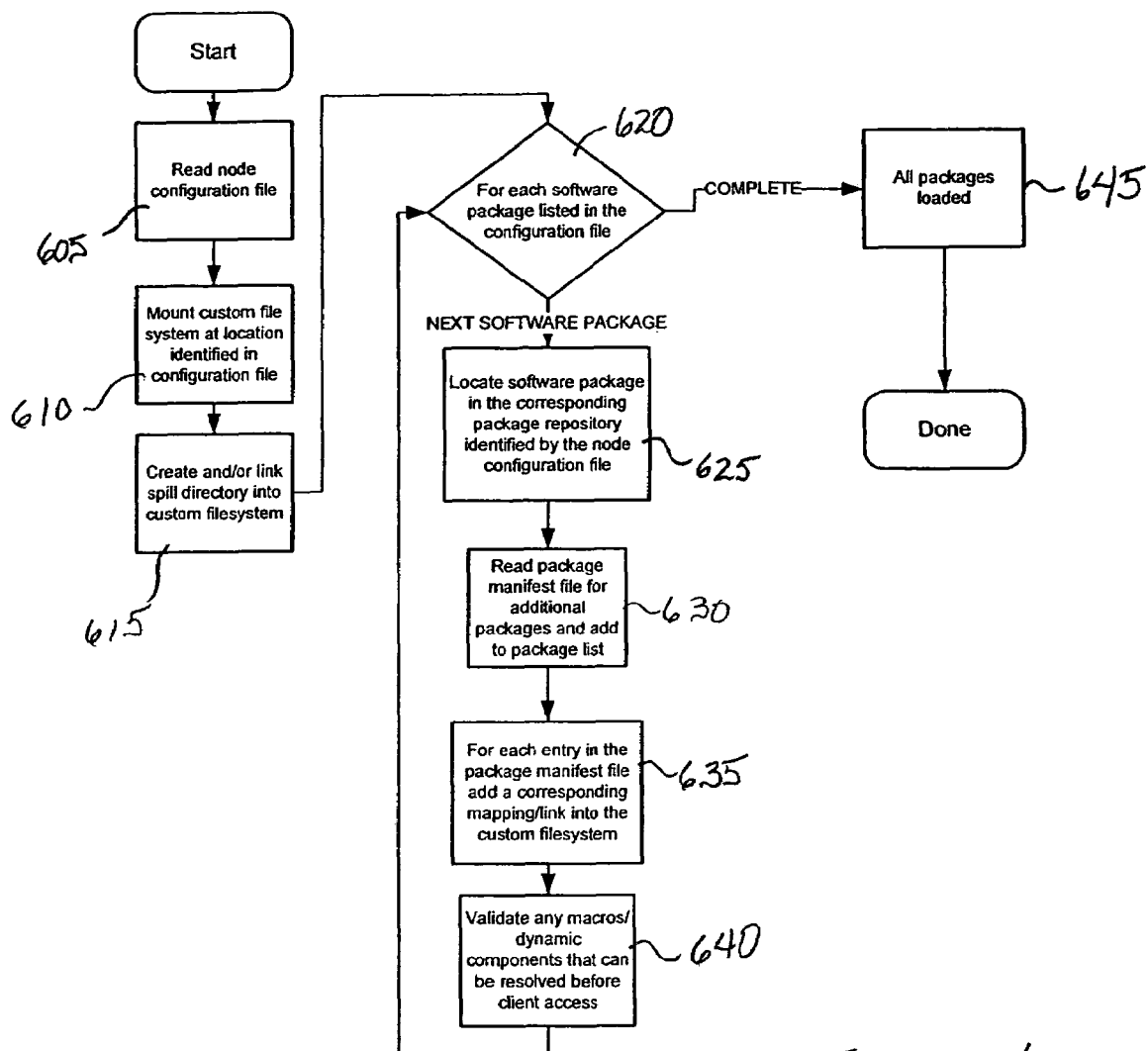
FIG. 6 is a flow chart showing a number of interrelated processing steps that may be used to generate a software package system used in an exemplary custom filesystem.

One manner in which a custom filesystem 145 may be generated using the information contained in the node configuration file is illustrated in FIG. 6. The operations used to generate the custom filesystem 145 may be automatically executed at boot time. Alternatively, the operations may be executed as part of a stand-alone configuration program that may be executed at any time by the user or system administrator.

As shown, the computer system 115 reads the corresponding node configuration file at step 605. The node configuration file may include information identifying the location at which the custom filesystem 145 is to be mounted. For example, the custom filesystem may be mounted at step 610 by mapping it into an existing directory structure of the local filesystem, called the mount point. Once the custom filesystem 145 is mounted at a given mount point, the files and directories of the custom filesystem may be accessed as if they are contained in the directory serving as the mount point. Mount points may be empty directories, since the contents of the directory serving as a mount point may become inaccessible to the local filesystem while the custom filesystem is mounted.

Once the custom filesystem has been mounted, the computer system 115 determines whether the spill directory identified in the node configuration file exists in the local filesystem 140 or server filesystem 137. If the spill directory exists, the spill directory is mapped into the custom filesystem 145 at step 615. If it does not exist, the spill directory is created and subsequently mapped into the custom filesystem 145.

As noted above, the node configuration file may include information identifying the software packages that are to be accessible to a user of a computer system 115 through the respective custom filesystem 145. These software packages are identified from the node configuration file at step 620. For each software package listed in the node configuration file, the system 115 locates the software package in the corresponding package repository identified by the node configuration file at step 625. The package manifest file is used at step 630 to determine whether any additional software packages need to be added to the list to render the software package complete. At step 635, each file used by the software package, as identified in the package manifest file is mapped from the server filesystem 137 and/or local filesystem 140 into the custom filesystem 145. Because the custom filenames used in the custom filesystem 145 are linked to a real filesystem, special tools or modifications to the real filesystem are not necessarily required. Linking between the custom filesystem 145 and the real filesystem may comprise the generation of virtual files, symbolic links, or the like, in the custom filesystem 145 that correspond to actual files in the real filesystem. Various mapping methods may be employed.

Any macros/dynamic components that can be resolved before the software package is used may be resolved at step 640. The processing shown at steps 620 through 640 may continue until all of the software packages that have been identified for access in the node configuration file have been mapped into the custom filesystem 145 at step 645.

Upon completion of the operations shown in FIG. 6, the custom filesystem 145 becomes active and is capable of handling file requests. Instructions now can be entered that refer to files on the custom filesystem. The instructions may be entered, for example, through a graphical user interface, a command line interface, or by another software program. Consequently, it may not be necessary to implement API (application programming interface) changes. If an instruction is received that does not refer to a file managed by the custom filesystem, regular execution of the instruction may be undertaken by one of the real filesystems. The custom filesystem 145 may be bypassed to access the real filesystems so that all files that are accessible through the real filesystems 140 may be viewable by the user, if desired. Bypassing of the custom filesystem 145 may be an option that is selectable by the user 130, or an option that is designated by the system administrator using the node configuration file.

The operations presented in FIG. 6 are exemplary and various implementations may have additional or different steps which would follow logically from this example. In the illustrated examples, the system 115 may determine which files, software packages, and/or software versions appear on the custom file system. To this end, as new software applications are added to the file system, a smaller and simpler routine can be performed that cycles through steps 625-640. Similarly, additional steps may be added to those shown in FIG. 6. For example, steps may be added to prompt the user 130 or query system 115 as to the suggested filename or path name for a given software application or package. This may be used to generate a more succinct or logical file hierarchy from the user's or system's perspective.

Figure 7:
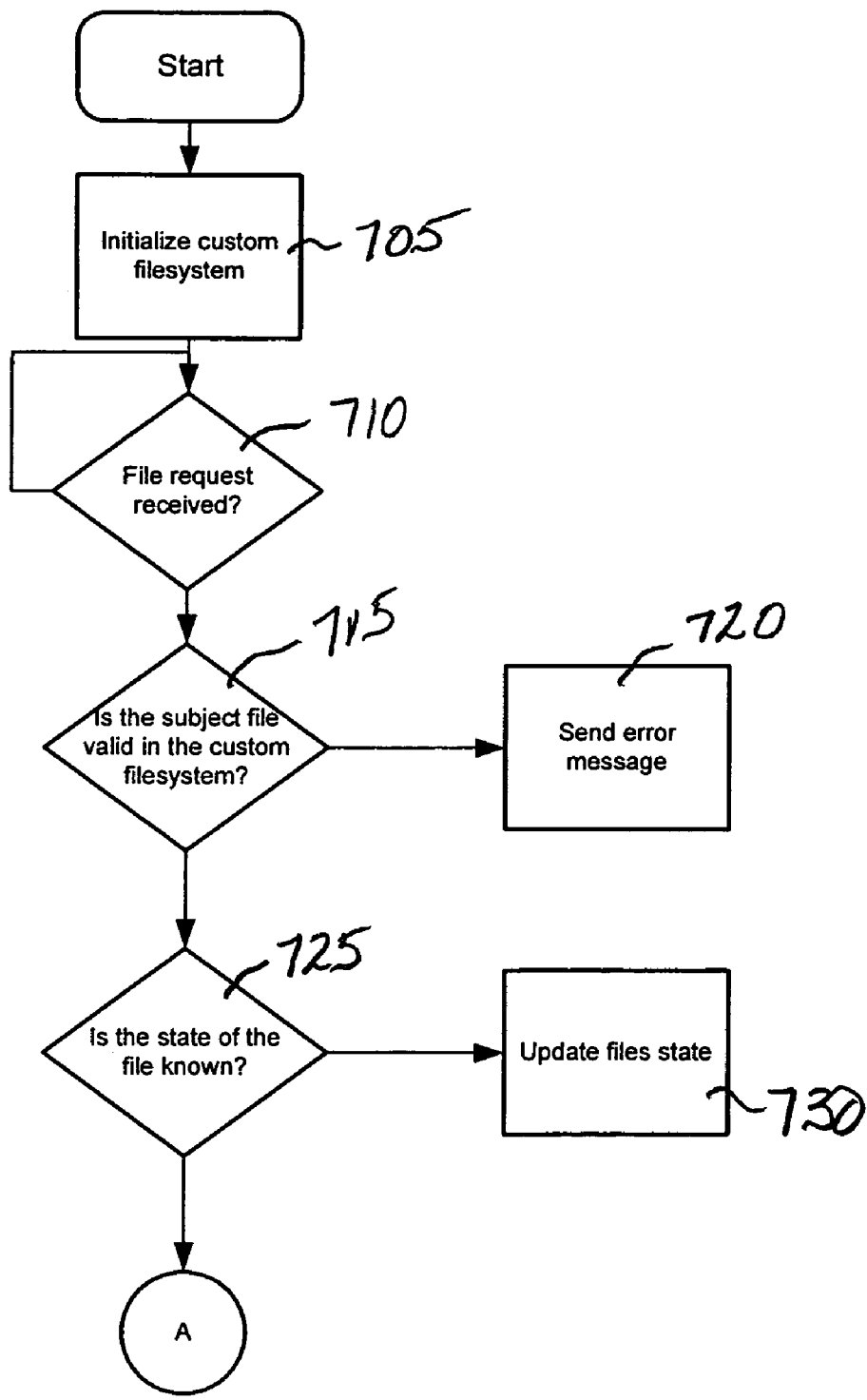
FIG. 7 is a flow chart showing a number of interrelated processing steps that may be used in the operation of an exemplary custom filesystem.
Figure 8:
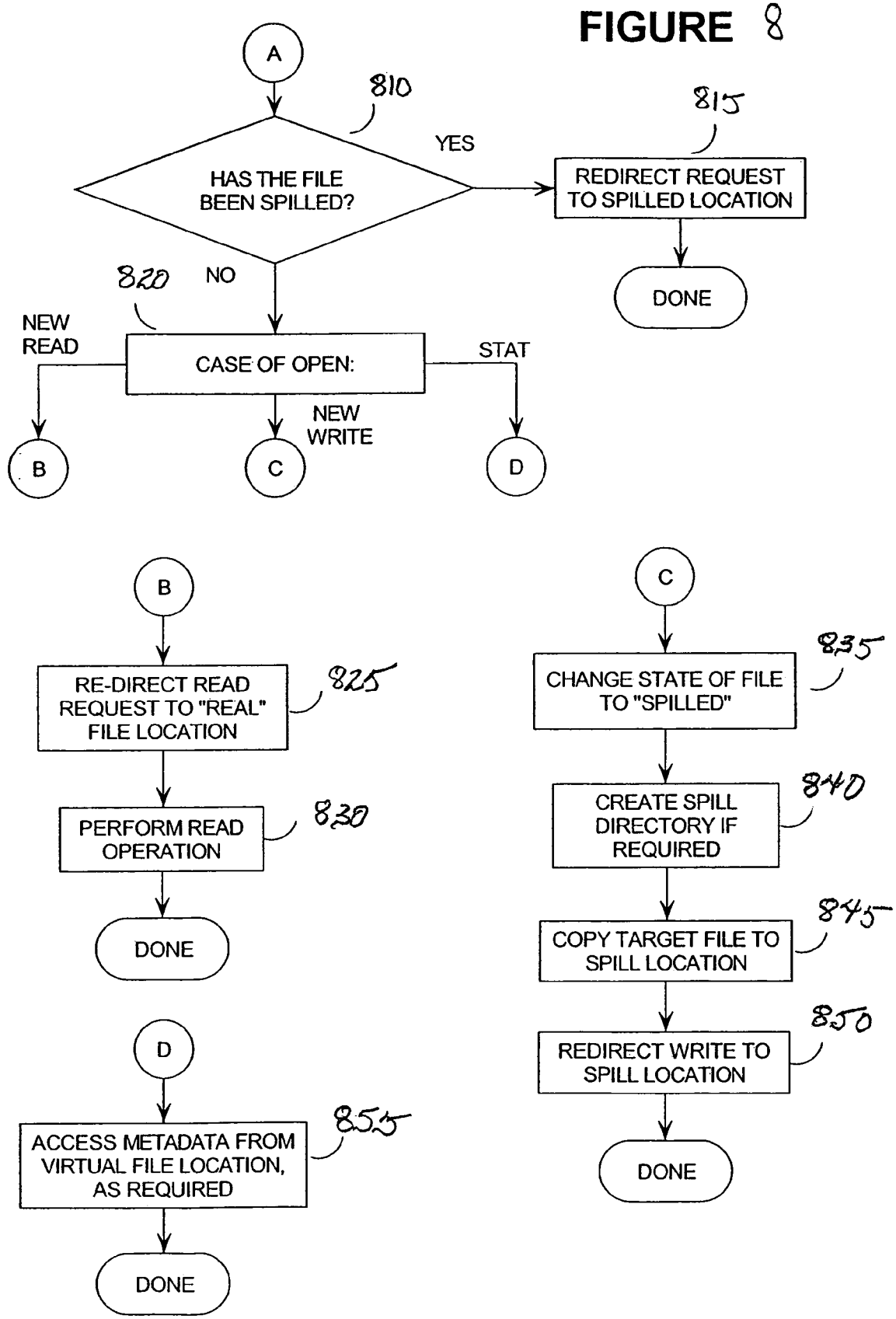
FIG. 8 is a flow chart showing a number of interrelated processing steps that proceed from the processes shown in FIG. 7.

One manner in which the custom filesystem 145 may respond to various types of file requests is shown in connection with FIGS. 7 and 8. As shown in FIG. 7, the custom filesystem 145 is initialized at step 705. Initialization of the custom filesystem 145 may proceed in a manner shown in FIG. 6. Once initialized, the custom filesystem 145 may enter an idle mode in which it waits for file requests from the respective system.

When the system 115 attempts to load an executable program, modify a file, or read a file, a request to that effect is generated and received by the custom filesystem 145 at step 710. On all requests, the custom filesystem 145 verifies that the subject file is managed as part of the custom file system at step 715. If the file is not valid, an error message or similar action is taken at step 720, and control returns to step 710 to await further requests. In one exemplary system, any failed search for a filename may fall through to another file system that is lower in the filesystem hierarchy.

If the file name is valid on the custom filesystem, the custom filesystem checks to determine whether the state of the file is known. There may be any number of states for a given file. In the exemplary system shown in FIGS. 7 and 8, three files states are employed: unknown, spilled and normal. Other states also may be used. For example, a file state of "cached" may be used to indicate that a local copy of a file is available, so it is not necessary to access a copy of the file over the network.

Initially, the states of all files of the custom filesystem may be marked as "unknown." As each file is accessed, a query may be made at step 725 to determine whether the state of the file is known. If the state of the file is "unknown", it may be updated at step 730 depending on the type of file request received at step 710. When a request has been made to modify or change the metadata associated with a target file, the custom filesystem 145 redirects the file request to a corresponding copy of the file in a predetermined spill directory. The spill directory may be one of the parameters identified in the node configuration file. This same redirection process may be followed if the state of the file is "spilled." If the state of the file is "normal", the file request may be redirected to the corresponding original file through the matching real filesystem. In this example, the state of the file affects the location that the custom filesystem uses to redirect the file request.

At step 810 of FIG. 8, the custom filesystem 145 checks to see if the state of the target file indicates that the target file has been spilled. If the target file has been spilled, the custom filesystem 145 directs the file request to the location of the corresponding copy of the spilled file in the spill directory at step 815. Spilled files are treated differently from other file types by the custom filesystem 145. Generally, the custom filesystem 145 treats all original files as read-only to protect their integrity. These files may be located on one or more servers 105 with multiple systems 115 concurrently accessing the same files. However, it may be desirable at some point to customize files for use by an individual system 115. Customization of such files may be implemented using a spill directory. To this end, the node configuration file contains a field identifying a spillroot directory that serves as the root of the spill file locations. If no spillroot is present, the corresponding system 115 is blocked from modifying files and may only operate in a read only mode. A file that has been modified through the custom filesystem 145 may be copied to a location within the spillroot directory hierarchy while the corresponding file on, for example, the server 105 remains in its original state. The custom filesystem 145 redirects subsequent file requests associated with the spilled file to the copied version in the spillroot directory as shown at step 815. This allows the system (or software which is operating), to modify a file without damaging or altering the original file, which may be shared by a multitude of other systems.

In the illustrated example, there are three basic types of file requests that may be made by a system 115: read requests, write requests and status requests. These request types branch from the case statement at step 820 and are shown at nodes B, C and D, respectively. A read request occurs when the system 115 attempts to access the contents of the target file without modification of the file contents. A write request occurs when the system 115 attempts to access and modify the contents of the target file. A status request occurs when the system 115 attempts to access the metadata for the target file to determine permissions, owner, access time or similar information.

On a read request, process control passes through the case statement of step 820 to branch B of FIG. 8. At step 825, the custom filesystem 145 redirects the read request to the real filesystem that contains the target file based on the mapping for the custom filesystem 145 generated, for example, at step 635 of FIG. 6. The read request is executed at step 830, and the results are provided through custom filesystem 145 from the corresponding real filesystem 140.

In order to maintain high throughput, subsequent read requests for a target file may be sent directly to the real filesystem that contains the original version of the target file. This may be advantageously used in connection with updates and changes since the custom filesystem configuration may change after the initial open for a read operation has been executed. As long as programs have opened up references to this file, they can continue to access it. When the target file is removed from the custom filesystem, further re-direction may be terminated. In the meantime, a new version of the file may be accessible thereby facilitating field updates and updates of critical running software without system downtime.

When a write request is received, process control may pass to branch C of FIG. 8. At step 835, the custom filesystem 145 marks the state of the target file as "spilled." If a suitable spill directory for copying the target file does not exist, a directory is created at step 840. The newly created directory may mimic the attributes of the directory containing the original target file. The target file may be copied to the spill location as shown at step 845. Once the copy operation is completed, the write request may be directed to the copy of the target file contained in the spill location as shown at step 850. Subsequent file requests relating to the original target file are directed by the custom filesystem 145 to the copy of the target file contained in the spill location.

On a status request to gather metadata, process control may pass to branch D of FIG. 8. At step 855, the custom filesystem 145 accesses metadata information relating to the target file and returns the information to the requester via the custom filesystem. The custom filesystem 145 may maintain its own metadata files for the virtual files that it manages. Alternatively, the custom filesystem 145 may itself access the metadata information from the original target file in response to the status request. In such instances, the custom filesystem does not perform a file re-direction. Rather, the custom filesystem 145 performs the request directly on behalf of the system 115.

Executing status requests in this manner has several advantages. For example, it provides an additional layer,of caching, resulting in a performance increase for status request operations. Further, it provides a mechanism in the custom filesystem that may be used to obtain additional information contained in the package description files. The recovery of a spilled file to restore it to its original state may take advantage of this feature. Version information about files, utilities and packages could also be referenced this way.

Occasionally, a file request is made to change the metadata for a target file. In such instances, the custom filesystem 145 makes the requested modifications and then treats the request the same as an open for writing request, spilling the file to the appropriate spill directory along with the updated metafile information. As in the case for a write request, any further accesses associated with the spilled file will be re-directed to the version in the spill location.

While file requests may be optimized to redirect access from the custom filesystem 145 directly to the package location of the original file, directory accesses may be executed in a different manner. When a directory entry is opened, it can only be for reading to obtain a listing of the names of the files in, or meta-data information about, the directory.

Although the custom filesystems 145 have been described in connection with individual computer systems 115, each custom filesystem 145 may be associated with any identifiable entity or entities on the computer network 100. Depending on the computing environment, these entities may include, for example, users, clients, computers, systems, nodes, and the like. In a personal computer (PC) environment, the custom filesystem may be associated with individual users 130 or, as described above, with individual computer systems 115.

In an environment with a variety of different machines and operating systems, such as the variety often found in a distributed computing environment, the combined custom filesystem 145 and local filesystem 140 cooperate to optimize network operation by routing requests for software to the proper machine binaries. For example, the computer network 100 may be implemented in an environment with QNX™ and/or Neutrino™ machines. Machines running these operating systems have the ability to transparently interact and communicate tasks to one another. By using custom filesystems on these machines, communication between these machines may be implemented even in those instances in which the machines and files are located in totally different filesystems.

Still further, management of the software applications used in the computer network 100 may be simplified. For example, one computer system 115 might be a computer with an x86 microprocessor running with a graphic user interface (GUI), Photon™ version 1.14; patch level "A," and an operating system, Neutrino version 2.00; while another node might be a PowerPC computer running Photon version 1.14 with no patch level applied and Neutrino version 2.00. Since these computers have different CPU types, different types of executable files are required in the corresponding /bin directories (one set of x86 executables and one set of Power PC executables). Additionally, different directory contents are required based on which version of the software is to run on the system 115 and which patch levels are to be applied. A system administrator may maintain all software application packages on servers 105 and provide access to selected versions of the software applications on a given computer system 115 using the corresponding node configuration file. Upgrades to the existing software packages can be made on the servers 105 without impacting the software that is run on a given computer system 115.

With the custom filesystem 145, the computer system 115, from the standpoint of the user 130, is not cluttered and may be greatly simplified. The user 130 is not confused by a number of different software versions and their respective libraries, patches, and support files because only the files pertaining to the configuration of the particular system are presented to the user through the custom filesystem. Providing this partial view of the complete filesystem removes complexity, making it easier for users to access the information that is needed.

The file management system may be used to optimize testing and deployment of new software versions. To this end, a proven version of the custom file system or its corresponding node configuration file may be stored prior to this testing and deployment. If the testing and deployment become problematic, the stored file may be used to roll-back the computer system 115 to a known state. Alternatively, an image of the custom filesystem when the custom filesystem is in a given state may be stored to facilitate subsequent roll-back of the custom filesystem to the given state. The image file may be used to replace an existing custom filesystem that is experiencing problems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of preparing and using a custom filesystem in conjunction with a real filesystem in a computer system, comprising the steps of:
    identifying attributes of the computer system;
    selecting a subset of software application files that are accessible to the computer system from a larger set of available software application files based on one or more of the identified attributes, wherein the selected of the subset of software application files comprises querying a configuration file of the computer systems to determine which version of a plurality of versions of a software application available through the real filesystem accessible by the computer system;
    mapping software application files of the subset of software application files into nodes of the custom filesystem, wherein said mapping of software application files comprises mapping files identified in one or more software package manifest files into corresponding node locations of the custom filesystem; and
    processing file requests relating to software application files of the subset of software application files using the custom filesystem prior to any processing of file requests relating to the subset of software application files by the real filesystem.

2. The method of claim 1, wherein the identified attributes comprise static characteristics of the computer system.

3. The method of claim 2, wherein the static characteristics comprise a microprocessor model and an operating system platform.

4. The method of claim 1, wherein the identified attributes comprise dynamic attributes.

5. The method of claim 4, wherein the dynamic attributes comprise preferences regarding accessible software applications and versions of the software applications that are accessible by the computer system.

6. The method of claim 1, wherein said selected of the subset of software application files comprises:
    querying a configuration file associated with the computer system to identify software packages that are accessible to the computer system; and
    for each software package identified while querying the configuration file, accessing a corresponding software package manifest file to identify file names and locations of files that are included in the software package.

7. The method of claim 1, wherein the identified attributes comprises:
    a location of at least one package repository on the real filesystem;
    a location of files corresponding to at least one software package on the real filesystem that is accessible to the computer system through the custom filesystem;
    a location for a filesystem root directory for the custom filesystem; and
    a location for a spill directory that is used in the custom filesystem.

8. The method of claim 1, and further comprising storing an image of the custom filesystem when the custom filesystem is in a given state to facilitate roll-back of the custom filesystem to the given state.

9. The method of claim 8, and further comprising responding to a request to roll-back the custom filesystem to the given state by replacing a current version of the custom filesystem with the custom filesystem stored in the image.

* * * * *